United States Patent [19]

Bendig et al.

[11] Patent Number: 4,849,276
[45] Date of Patent: Jul. 18, 1989

[54] THERMAL INSULATION STRUCTURE

[75] Inventors: Anna L. Bendig; Douglas McLaren, both of Seattle, Wash.

[73] Assignee: The Boeing Company, Seattle, Wash.

[21] Appl. No.: 875,807

[22] Filed: Jun. 17, 1986

Related U.S. Application Data

[63] Continuation of Ser. No. 581,305, Feb. 17, 1984, abandoned.

[51] Int. Cl.$^4$ .............................................. B32B 3/12
[52] U.S. Cl. .................................... 428/117; 52/806; 181/292
[58] Field of Search ................ 428/117, 73, 116, 118, 428/119; 181/292; 52/806

[56] References Cited

U.S. PATENT DOCUMENTS

| | | | |
|---|---|---|---|
| 2,658,332 | 11/1953 | Nicholson | 239/127.3 |
| 2,922,291 | 1/1960 | Fox et al. | 244/117 |
| 2,941,759 | 6/1960 | Rice et al. | 244/117 |
| 3,043,103 | 7/1962 | Dent et al. | 239/127 |
| 3,116,613 | 1/1964 | Evelyn et al. | 244/117 |
| 3,122,883 | 3/1964 | Terner | 239/127.3 |
| 3,131,535 | 5/1964 | Hensley | 239/127.1 |
| 3,137,604 | 6/1964 | Bosch | 428/116 X |
| 3,137,998 | 6/1964 | Beam, Jr. | 239/127.3 |
| 3,145,000 | 8/1964 | Mackie | 428/116 X |
| 3,210,233 | 10/1965 | Kummer et al. | 428/117 |
| 3,249,659 | 5/1966 | Voelker | 181/292 X |
| 3,321,154 | 5/1967 | Downs | 244/117 |
| 3,353,359 | 11/1967 | Webb | 239/127.3 |
| 3,502,171 | 3/1970 | Cowan | 428/116 X |
| 3,551,266 | 12/1970 | Webb | 428/119 |
| 3,622,430 | 11/1971 | Jurisich | 428/116 X |
| 3,656,317 | 4/1972 | Gray | 239/127.3 |
| 3,720,075 | 3/1973 | Gray | 244/117 |
| 3,799,056 | 3/1974 | Colignon | 244/117 |
| 3,848,697 | 11/1974 | Jannot et al. | 239/127.3 |
| 3,910,039 | 10/1975 | Fortini | 239/127.3 |
| 4,035,535 | 7/1977 | Taylor | 428/116 |
| 4,066,183 | 1/1978 | Armstrong | 428/64 X |
| 4,071,194 | 1/1978 | Eckert et al. | 239/127.3 |
| 4,162,341 | 7/1979 | Norton | 428/117 |
| 4,235,303 | 11/1980 | Dhoore et al. | 428/116 X |
| 4,248,752 | 2/1981 | Myles | 428/698 X |
| 4,257,998 | 3/1981 | Diepenbrock, Jr. et al. | 428/116 X |
| 4,265,955 | 5/1981 | Harp et al. | 428/116 |
| 4,642,271 | 2/1987 | Rice | 428/698 |

FOREIGN PATENT DOCUMENTS 930754 7/1963 United Kingdom ............... 428/117

OTHER PUBLICATIONS

Title Page, Verso of Title Page and Page 136 of Webster's Seventh New Collegiate Dictionary, G. C. Merriam Company, Publishers, Springfield, Massachusetts.

*Primary Examiner*—Henry F. Epstein
*Attorney, Agent, or Firm*—John C. Hammar

[57] ABSTRACT

A thermal insulating structure for providing thermal insulation, structural load accommodations, and noise attenuation for surfaces in aerospace systems that are exposed to high temperatures. At the side adjacent the structure to be protected is a high-temperature solid back sheet to which is adhesively bonded a honeycomb core having a perforated buried septum. A layer of cast fiber-ceramic insulation is secured to the honeycomb core, filling portions of the core outward from the septum and extending beyond the outer face of the core. To absorb structural loads, a densified top coat overlies the insulating layer. To minimize the transmission of shear-inducing loads into the insulating layer, the outer face of the honeycomb core has an irregular surface. Core cell vents extending through the walls of adjacent cells provide a controlled airspace between the back sheet and the buried septum through which a fluid coolant may be circulated.

14 Claims, 1 Drawing Sheet

THERMAL INSULATION STRUCTURE

REFERENCE TO RELATE APPLICATIONS

This application is also related to application Ser. No. 698,496, filed Feb. 5, 1985, and Ser. No. 012,585, filed Jan. 9, 1987.

This application is a continuation of application Ser. No. 581,305, filed Feb. 17, 1984, now abandoned, the benefit of the filing of which is hereby claimed under 35 USC 120.

BACKGROUND OF THE INVENTION

The present invention relates generally to thermal insulation, and, more particularly, to a structure for providing thermal insulation, structural load accommodation, and noise attenuation for aircraft, missiles, and other aerospace systems having surfaces exposed to high temperatures.

In ducting hot exhaust gases from the engines of high-speed aircraft, it is necessary to protect the surrounding structure from excessively high temperatures. The required protection is typically accomplished through the use of multilayered structures that have a refractory material on the surface exposed to the high-temperature gases. Passageways for the circulation of cooling fluid are often provided between the refractory insulation layer and the underlying substructure of the aircraft. In such arrangements, a refractory metal, such as columbium, may be used to fabricate the layer that encounters the exhaust gases. A substructure consisting of one or more spaced-apart layers of superalloy underlie the refractory metal. While these arrangements are effective, they are not entirely satisfactory from the standpoint of cost and efficiency. To provide and circulate the coolant, it is necessary to use a portion of the engine output. To meet the cooling requirements of a high-powered engine exhaust duct, a significant energy expenditure is required. Commonly, as much as 50 percent of the available output may be needed for cooling purposes. This energy expenditure dramatically reduces the overall efficiency of a high-shaft-power or thrust propulsion system. A further disadvantage of these arrangements is the added weight and expense attributable to the materials used for the insulating layer and the underlying substructure.

The outer surfaces of space vehicles are also subjected to high temperatures during reentry. To protect these vehicles from the heat generated during reentry, various arrangements utilizing ablative materials have been heretofore proposed, often in combination with transpirational cooling systems. Because of their ablative characteristics, such systems are not well suited for insulating the surfaces of reusable spacecraft. Accordingly, efforts have been directed toward the development of nonablative insulating structures. In the present space shuttle, for example, portions of the shuttle exterior surface are insulated with a plurality of ceramic tiles that are arranged in a closely spaced, ordered array. To provide the required fit, each tile must be precision cut from a carefully formed fused ceramic blank. To form the blanks, silica fibers and other ceramic components are initially mixed into a slurry and cast into blocks. After drying, the blocks are sintered at high temperatures to form strong ceramic bonds between the overlapping fibers. The blocks are sawn thereafter into the smaller blanks that are subsequently configured into the final tiles by a numerically controlled mill. Once prepared each tile is individually secured in place via a manual procedure. This involves bonding the tiles to a felt strain isolation pad with a high-temperature adhesive, then adhesively bonding the pad to the underlying metallic substructure.

During takeoff and reentry, nonuniform temperature gradients exist across the surface of the space shuttle, which is insulated with these ceramic tiles. The fused ceramic structure of the tiles is poorly resistant to shear forces, and, thus, poorly resistant to the forces occasioned by the differential surface temperature distribution. Accordingly, to prevent breakage of the ceramic insulation, the tiles must be limited to small sizes, generally less than ten inches on a side. While this isolates the loads applied to the insulation, it does so by exacting an extremely high cost in terms of parts production and assembly onto the spacecraft.

For applications other than the space shuttle, these high costs may render the ceramic tile approach unfeasible. Where the application dictates the use of an unbroken, i.e., continuous, insulation surface, the ceramic tile approach would be entirely unworkable. Since the cast ceramic blocks shrink substantially and in an irregular manner during the sintering operation, the use of such fused fibrous ceramic materials is also not well suited for forming insulating surfaces that have a substantial degree of curvature.

The present invention provides an arrangement that overcomes the disadvantages of the developments described above. In particular, the invention provides an insulating structure that not only affords protection against high temperature, but also accommodates loads. This load-bearing capability enables a reduction in the amount of substructure required to support the insulation, and, thus, contributes to an overall reduction in the weight of the craft. The invention provides, as well, a thermal insulating structure that also functions as a noise attenuator and, thus, is particularly well suited for use in an aircraft engine exhaust duct. An important aspect of the invention is the provision of a thermal insulating structure that is fabricated by casting a fibrous ceramic insulation material onto a honeycomb core. In accordance with a particular aspect of the invention, this manufacture of the insulating structure is enabled through the use of a honeycomb core having a perforated buried septum. As a result of the support provided by the honeycomb core to the ceramic insulation, structures having continuous insulating surfaces may be fabricated in a wide variety of shapes and configurations

SUMMARY OF THE INVENTION

In accordance with the invention, there is provided a thermal insulator structure having a honeycomb core secured along an inner face to a substrate. The honeycomb core includes open cells that extend between the inner and outer faces of the core. A layer of insulating material fills outer portions of the cells forming enclosed cavities, immediately outward from the substrate. In a preferred form, the separation of the cells into inner and outer cavities is effected by a septum that is buried within the honeycomb core in spaced relation to the inner and outer faces thereof. In this arrangement, it is preferred that the septum be perforated so that the insulator layer may be formed by vacuum casting a fibrous ceramic insulation material into the honeycomb core, either before or after the core is secured to the substrate. Where it is desired to join the honeycomb core and substrate prior to casting the insulator layer, the substrate is selectively perforated and passageways are provided between the cells. The insulator layer is then formed by pulling the ceramic fibers from a slurry by means of a vacuum that is drawn on the back of the substrate and applied via the substrate perforations and cell passageways to the inner face of the perforated buried septum. Where the insulating layer is formed prior to joining the honeycomb and substrate, the vacuum is applied directly to the face of the buried septum through the open ends of the cells that lie along the inner face of the core.

To protect the honeycomb core and the buried septum in high-temperature applications, it is preferred that the insulating layer extend outward from the outer face of the core. The outer face of the core preferably has a textured surface to minimize the transfer of loads at the interface between the insulation layer and core. To provide structural durability to the insulator layer, the outer surface thereof is strengthened or densified. In lieu of strengthening a densified top coat is optionally applied to the layer of insulating material. Where a fibrous ceramic material is utilized for the insulating layer, the top coat is preferably reinforced glass. Where noise attenuation is required, the top coat is provided with a controlled porosity.

BRIEF DESCRIPTION OF THE DRAWINGS

The invention can be understood by the following portion of the specification taken in conjunction with the accompanying drawings in which.

DETAILED DESCRIPTION OF THE INVENTION

Figure 1:
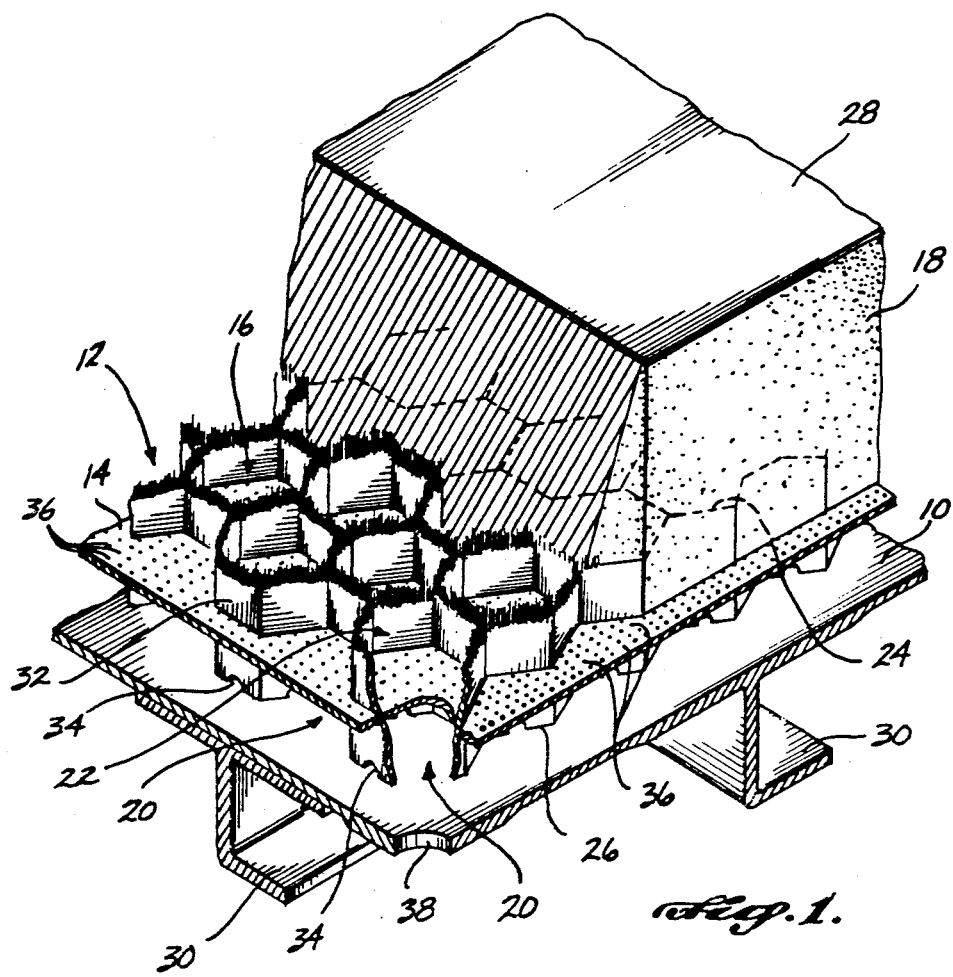
FIG. 1 is a perspective view, partially in section, showing a thermal insulating structure in accordance with the invention.

Referring to FIG. 1, a preferred arrangement for the thermal insulating structure of the invention has a substrate or back sheet 10 to which is secured a honeycomb core 12. The honeycomb core 12 has a plurality of individual cells 16 that are isolated from one another and arranged in a geometric pattern. A septum 14, having perforations 36, is buried, or formed internally, within the honeycomb core 12 in spaced-apart relation to the substrate 10. The septum 14 is a generally planar, continuous structure that is configured from a plurality of individual coplanar septa that are secured to the walls 32 of each individual cell 16 of the core. The positioning of the septum divides the honeycomb core 12 along its length and separates the cells 16 into inner and outer cavities 20 and 22, respectively. An insulator layer 18 is secured to the honeycomb core 12, filling the outer cavities 22 of the cells and extending outward beyond the free edge, or outer face, 24 of the honeycomb core. The insulator layer 18 is preferably constructed of a fibrous ceramic material that is vacuum cast into the honeycomb core 12 by a process more fully described below. A densified top coat 28 having a controlled porosity covers the insulating layer 18, completing the structure and providing the surface that is exposed in use to the high temperatures.

Figure 2:
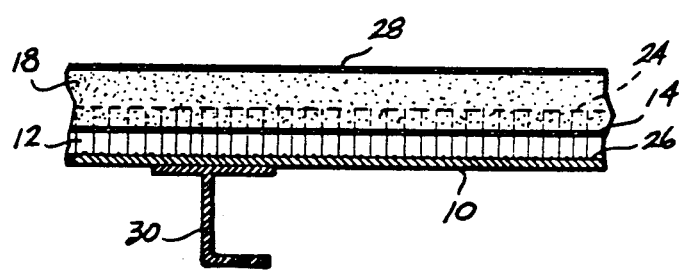
FIG. 2 is a side elevation view, partially in section, of the structure of FIG. 1.

As will become apparent hereinafter, the invention permits the manufacture of thermal insulating structures having a wide variety of shapes and configurations. In use, the physical configuration and other design parameters of the particular application will dictate the means and manner in which the thermal insulating structure is secured to the structure that is to be protected from heat. For clarity of illustration, FIGS. 1 and 2 show an exemplary arrangement that would be suitable for a large, relatively flat insulating surface. This insulating structure is attached to the underlying substructure by attachment flanges, or stiffeners, 30. The number of flanges 30 and the placement thereof are in accordance with known techniques that do not form part of this invention. It is to be noted, however, that the insulating structure according to the invention is capable of carrying loads that would otherwise be borne by the underlying substructure. This accordingly permits a reduction in the amount of substructure that is required and contributes to a further lightening of the craft.

The invention aims, as well, to provide a thermal insulating structure that permits a wide latitude of design choices, both in terms of material selection and physical configuration of the components. This latitude is particularly advantageous since each application presents different heat characteristics. For example, in engine exhaust duct applications, the temperatures encountered are high, but relatively constant. On the other hand, for space reentry vehicle applications, significantly higher temperatures may be encountered for short durations during takeoff and reentry. Immediately after flight, there are different thermal problems presented by the need to dissipate heat stored in the insulating structure during reentry. To accommodate these varied applications, the present invention permits precise control over the thickness and density of the insulating layer 18 and placement of this layer relative to its supporting honeycomb core 12 and the underlying back sheet 10. This is enabled in part by the wide latitude in material selection and in part through the use of a buried septum 14 that facilitates manufacture of an insulator layer having uniform fill density. The employment of the septum 14 also permits the provision of a controlled air gap between the insulator layer 18 and back sheet 10 through which a cooling fluid can be uniformly distributed if desired. Since the porosities of the insulating layer 18 and top coat 28 may also be controlled, the structure may be transpirationally cooled by forcing fluid outward through the structure.

With this ability to control the heat transfer through the insulator layer 18, it is possible to select various materials for the honeycomb core 12 and the back sheet 10. The proper selection is, once again, dependent upon the particular application. For high-temperature applications, suitable materials for the back sheet 10 include metals, such as steel or aluminum, and matrix composites of the types now known and used. High-temperature polymer matrix composites are particularly desirable since the thermal expansion characteristics of these materials may be matched with the expansion characteristics of other components of the structure in order to minimize warping.

Honeycomb core 12 also may be formed from either metallic or nonmetallic materials to suit the particular application. Honeycombs of this type are well known and are typically formed from strips of nonmetallic fabric or from metallic foil or ribbons that are joined together at intervals to form geometrically shaped cells. Most often, the cells have hexagonal shapes, although other shapes are readily available or could be specially provided for a given use. The thickness of the cell walls and the face-to-face height of the honeycomb are also variables that are subject to a wide range of design choices. It is to be understood that the present invention contemplates usage of any cellular core without limiting regard to the particular material, the size and shape of the cells, or the physical shape and dimensions of the core. Thus, the cells 16 may be formed other than in hexagonal shapes and may have various thicknesses for the cell walls 32. In a particular application, the amount of heat to be borne by the core and/or transmitted to the back sheet 10 will dictate the selection of the thickness of the insulation, and the core parameters such as material, cell cross section, cell wall thickness, and face-to-face height. To withstand or dissipate substantially high temperatures, it may be necessary to employ a ceramic or refractory metal core, while, in lower temperature applications organic or nonrefractory metal cores may be satisfactorily used.

Since it is intended that the insulating structure accommodate structural loads, it is preferred that measures be taken to control the sensitivity of the insulating layer to external forces. To minimize the sensitivity of the insulating layer 18 to structural flaws and to control the manner in which loads are transferred to and distributed into the insulator layer, the outer face 24 of the honeycomb core is provided with a textured surface. The presence of a textured surface provides a transition zone between the insulator layer 18 and the core. This transition zone minimizes stress concentration factors at the interface between the honeycomb core and the insulator layer. Where the honeycomb core 12 is constructed from glass fibers, this textured surface is provided by fraying the outer face 24 of the core by shredding or through the use of a chemical solvent. Mechanical or chemical means could similarly be used to notch, abrade or otherwise provide texture to the outer face of a metallic or ceramic core.

By casting the insulating layer 18 into the honeycomb core 12, two important functional advantages are achieved. First, since structural support is provided for the ceramic fibers that form the insulating layer 18, large, continuous insulating surfaces may be formed. This is in contrast to prior approaches in which it is necessary to fragment the insulating surface into small pieces to provent breakage of the fragile ceramic insulator. Second, the honeycomb core 12 is easily and securely attachable to the back sheet 10 through the use of conventional techniques such as adhesive bonding or brazing. This eliminates difficulties that have been encountered heretofore in attempting to join an insulating layer directly to a backing substrate.

In conjunction with the septum 14, the use of honeycomb core 12 also permits the formation of a controlled airspace between the buried septum 14 and the back sheet 10 or between the insulating layer 18 and the back sheet in instances where the buried septum is removed, as will be explained hereinafter. To provide this airspace, the inner cavities 20 of the cells are interconnected via core cell vents, or passageways, 34 that pass through the cell walls 32. The airspace provided by the interconnected cells may be used either passively or actively. For active cooling beneath the insulating layer 18, a suitable coolant may be circulated through the cells by means of the core cell vents 34. If desired, the insulating layer 18 and top coat 28 may be made permeable to permit passing a fluid coolant through the interconnected cells, through the perforations 36 in septum 14, and outward to transpirationally cool the structures.

FIG. 1 illustrates one suitable arrangement of the core cell vents 34. It is to be understood that the core cell vents 34 may be of a different number and shape and located other than as illustrated in this FIGURE. As will be explained below, the core cell vents are also used in casting the ceramic insulating layer 18 onto the core in the instances when the core 12 is first bonded to the backing sheet 10.

The septum 14 is formed in situ within the core 12 from a film-forming resin. A wide variety of resins is available for forming septum 14, but those exhibiting high-temperature characteristics are preferred for most applications. Of these high-temperature varieties, polyimides are particularly well suited. The process for creating the septum is initiated by partially embedding the core with a suitable material, such as wax, which has a lower melting point than the selected film-forming resin. The depth of the embedded core is selected in accordance with the desired location of the septum, which, in turn, is dictated in accordance with the desired positioning of the insulating layer relative to the back sheet 10 in the final structure. Depending upon the application, the septum may be located anywhere between the inner and outer extreme faces 26 and 24, respectively of the honeycomb core 12. To assure a clean bond between the core and back sheet 10, it is preferred that the septum be located at least some distance away from the inner edge or face, 26 of the honeycomb core.

To form the septum, the embedded wax or other material is covered with an uncured film of resin. After the resin has cured, the wax or other material is removed, leaving the cured resin as a septum that is buried or suspended internaly within the honeycomb core 12, i.e., positioned "through" the cells in spaced relation to the outer and inner faces, 24 and 26, respectively. The septum is then laser drilled to provide the perforations 36 required for vacuum casting the insulator layer 18. The process just described is similar to the process for making sound-insulating panels described in commonly assigned U.S. Pat. No. 4,257,998 to Diepenbrock, Jr. et al. According to this latter process, a septum material is spread on top of a destructible mold, the top of the mold having upstanding studs that penetrate through the septum material. A cellular core is pressed through the septum material and into the material of the destructible mold until the septum is internally positioned where desired within the core. After the septum is hardened, the destructible mold is removed from the core, leaving the septum in place. Such a process is a suitable alternative for forming the septum 14 of the instant invention. Further details thereof may be obtained by reference to this U.S. Pat. No. 4,257,998, the disclosure of which is hereby incorporated by reference. Further details of the structure produced thereby may be obtained by reference to commonly assigned U.S. Pat. No. 4,265,955 to Harp et al., the disclosure of which is hereby incorporated by reference.

As mentioned above, the presence of the perforations 36 also permits venting a coolant outward through the insulating layer 18 for transpirational cooling purposes. The number and size of the perforations 36 are selected in accordance with the needs of the application. For example, where different sections of the same insulating structure are subjected to differential pressures, as in a long exhaust duct, it may be desirable to configure the perforations 36 to function as auxiliary routes for pressure relief for the open inner cavities 20 of the cells. On the other hand, where noise attenuation is a prime concern, smaller and fewer perforations would be desirable.

As briefly noted above, the insulator layer 18 is formed by casting a ceramic insulating material into the outer cavities 22 of the honeycomb core. While a variety of casting processes may be employed, it is preferable to use a vacuum casting process in which the insulator layer is formed by pulling a ceramic fiber-containing slurry through the open outer face of the core by means of a vacuum drawn on the underside of the buried septum 14.

The insulator layer 18 may be formed onto the honeycomb core 12 either before or after bonding the core to the back sheet 10. When the honeycomb core and back sheet are joined prior to formation of the insulating layer, provision must be made for applying a vacuum through the back sheet 10 into the inner cavities 20 of the cells. For this purpose, back sheet 10 is provided at selective intervals with vacuum ports 38. Since the inner cavities 20 of the cells are in fluid communication via the core cell vents 34, vacuum may be applied uniformly to the underside of the septum 14. For purposes of clarity, the attachments needed for vacuum processing have not been shown in the FIGURES. The means and manner of providing such attachments will, of course, be readily apparent to those familiar with the art of ceramic vacuum casting.

Where the insulating layer 18 is formed onto the core prior to bonding the core to the backing sheet, the vacuum is applied directly through the open ends of the cells. In this instance, the core is fitted within a suitable vacuum fitting.

For most applications, it is preferred that the outer surface of the insulator layer 18 be strengthened somewhat in order to absorb structural loads. this may be accomplished by densifying the outer surface of the insulator layer 18 as, for example, through heat treatment of the ceramic insulating material or through selection and control of the process variables during formation of the final thickness of the layer. Alternately, and as illustrated in the FIGURES, a separate top coat 28 may be formed over the insulator layer 18 through the addition of secondary materials. It will be appreciated that a wide range of fibrous, glassy, and particulate materials and mixtures and solutions thereof are suitable for this purpose.

A particularly desirable material is a ceramic material that is easily fused to the underlying insulator layer 18. For added durability, the top coat may optionally include some reinforcement. A mesh-reinforced glass satisfies both of these criteria and is, thus, preferred.

It is particularly desirable to control the porosity of the densified top coat to permit taking advantage of the noise-attenuating nature of the porous ceramic insulating layer 18. By providing sufficient porosity to the top coat 28, the thermal insulating structure may also usefully provide noise abatement. This is particularly useful for applications such as engine exhaust ducts for commercial aircraft auxiliary power units. The means and manner of controlling the porosity of the top coat will be apparent to those skilled in the art.

While the septum 14 is required during the formation of the insulating layer 18, there may be instances in which it is desirable to remove the septum. For example, where high temperatures are to be encountered by the structure, undesired outgassing of the organic septum may occur. To prevent this, the septum may be removed prior to bonding the honeycomb insulator assembly to the back sheet 10. The means used to effect removal will, of course, depend upon the material used for the septum. By way of example, a polyimide septum might be removed by chemical or thermal means.

The present invention has been described in relation to its preferred embodiments. One of ordinary skill, after reading the foregoing specification, will be able to effect various changes and substitutions of equivalents without departing from the broad concepts disclosed herein. It is therefore intended that the protection afforded by Letters Patent granted hereon be limited only by the definition contained in the appended claims and equivalents thereof.

The embodiments of the invention in which an exclusive property or privilege is claimed are defined as follows:

1. Thermal ceramic insulation, comprising:
   (a) a honeycomb core having a plurality of cells;
   (b) fiberformed ceramic insulation partially filling each cell of the core and forming a porous sheet on one face of the core; and
   (c) a reinforced glass top coat attached to the porous sheet.

2. The insulation of claim 1 wherein the core includes a textured surface that is embedded within the ceramic insulation to minimize stress concentration at the interface between the core and the sheet.

3. The insulation of claim 2 further comprising a perforated septum within each cell of the core adjacent to the ceramic insulation, the septum defining inner and outer cavities of each cell, the ceramic insulation substantially filling the outer cavity of each cell.

4. The insulation of claim 2 further comprising at least one core cell vent in each inner cavity of the core for fluid communication between the inner cavities of the cells.

5. The insulation of claim 3 further comprising at least one core cell vent in each inner cavity of the core for fluid communication between the inner cavities of the cells.

6. The insulation of claim 4 further comprising a substrate attached to the core adjacent the inner cavities and spaced apart from the ceramic insulation.

7. The insulation of claim 5 further comprising a substrate attached to the core adjacent the inner cavities and spaced apart from the ceramic insulation.

8. The insulation of claim 6 further comprising at least one port in the substrate for fluid communication from the inner cavities through the substrate by the port.

9. The insulation of claim 7 further comprising at least one port in the substrate for fluid communication from the inner cavities through the substrate by the port.

10. The insulation of claim 2 wherein the top coat has sufficient porosity to allow the insulation to be used for noise abatement.

11. The insulation of claim 2 wherein the core is made from metal.

12. The insulation of claim 3 wherein the septum is made from polyimide.

13. The insulation of claim 6 wherein the core and the substrate are made from metal.

14. The insulation of claim 1 wherein the ceramic insulation and top coat are fluid permeable for transpirational cooling by flow of fluid through the ceramic insulation and top coat.

* * * * *

UNITED STATES PATENT AND TRADEMARK OFFICE
CERTIFICATE OF CORRECTION

PATENT NO. : 4,849,276

DATED : July 18, 1989

INVENTOR(S) : Anna L. Baker

It is certified that error appears in the above-identified patent and that said Letters Patent is hereby corrected as shown below:

On the title page, item [19] should read --Baker--.

Item [75] should read -- Anna L. Baker--.

Signed and Sealed this

Twentieth Day of November, 1990

Attest:

HARRY F. MANBECK, JR.

*Attesting Officer*  *Commissioner of Patents and Trademarks*